United States Patent [19]

Seelert et al.

[11] Patent Number: 5,344,869
[45] Date of Patent: Sep. 6, 1994

[54] THERMOPLASTIC MOLDING MATERIAL

[75] Inventors: Stefan Seelert, Frankenthal; Peter Klaerner, Battenberg; Andreas Jung, Mannheim; Hans Hoenl, Obersuelzen; Bertram Ostermayer, Roedersheim-Gronau, all of Fed. Rep. of Germany

[73] Assignee: BASF Aktiengesellschaft, Ludwigshafen, Fed. Rep. of Germany

[21] Appl. No.: 981,543

[22] Filed: Nov. 25, 1992

[30] Foreign Application Priority Data

Nov. 30, 1991 [DE] Fed. Rep. of Germany ....... 4139627

[51] Int. Cl.$^5$ .................... C08L 25/10; C08L 53/02
[52] U.S. Cl. ................................ 524/505; 525/95; 525/98; 525/314; 525/326.1; 525/940
[58] Field of Search ................ 524/502, 505; 525/98, 525/314, 326.1, 940, 95

[56] References Cited

U.S. PATENT DOCUMENTS 4,031,166 6/1977 Bronstert ........................ 525/98
5,036,130 7/1991 Walter et al. ................... 524/505

FOREIGN PATENT DOCUMENTS

| | | |
|---|---|---|
| 004685 | 10/1979 | European Pat. Off. . |
| 042153 | 12/1981 | European Pat. Off. . |
| 125227 | 11/1984 | European Pat. Off. . |
| 310051 | 4/1989 | European Pat. Off. . |
| 2003916 | 8/1971 | Fed. Rep. of Germany . |
| 2839357 | 3/1979 | Fed. Rep. of Germany . |
| 250970 | 1/1988 | Fed. Rep. of Germany . |
| 2003891 | 3/1979 | United Kingdom . |

*Primary Examiner*—Paul R. Michl
*Assistant Examiner*—Tae H. Yoon
*Attorney, Agent, or Firm*—Keil & Weinkauf

[57] ABSTRACT

Thermoplastic molding materials contain, based in each case on the sum of components A, B and C, A: from 10 to 90% by weight of a polymer A composed of styrene and/or substituted styrene,
B: from 10 to 90% by weight of a polyolefin B and
C: from 5 to 40% by weight of a star block copolymer C containing not less than 50% by weight of styrene and prepared by anionic polymerization of styrene and butadiene and/or isoprene, coupling and subsequent selective hydrogenation.

12 Claims, No Drawings

THERMOPLASTIC MOLDING MATERIAL

Polystyrene is a material which has good processibility but is very brittle. For toughening polystyrene, it is usual to carry out the free radical polymerization of the styrene in the presence of a polybutadiene rubber. Toughened polystyrenes are then obtained. Another possibility is to blend the polystyrene with butadiene/styrene block copolymers. However, the thermoplastic molding materials prepared by these processes still contain double bonds which originate from the butadiene and lead to yellowing of the material and to embrittlement on exposure to UV radiation or at elevated temperatures.

Toughened polystyrene can also be prepared by polymerizing styrene in the presence of an EPDM rubber, i.e. an ethylene/propylene/diene terpolymer. The difficulty here is that the EPDM rubbers as a rule do not have a sufficiently large number of possible reaction sites at which grafting of the styrene onto the EPDM rubber can occur. Consequently, the resulting rubber particles are large (10–20 μm), which gives rise to a dull surface and, owing to the insufficient binding of the rubber phase to the surrounding polystyrene matrix, the mechanical properties of these products are unsatisfactory.

Another possibility for preparing tough polystyrene molding materials which are free of double bonds is to blend polystyrenes and hydrogenated styrene/butadiene block copolymers. In order to achieve adequate toughness with this method, however, very large amounts of hydrogenated styrene/butadiene block copolymers are required. This gives rise to delamination problems in the production of moldings. Furthermore, owing to the high prices of the hydrogenated styrene/butadiene block copolymers, the method is not of industrial interest.

One method for overcoming the stated difficulties is to prepare blends of polymers containing styrene and/or substituted styrene and polyolefins; such blends can be used as molding materials which are resistant to weathering. Polystyrenes and polyolefins are polymers which are not miscible with one another on a molecular scale. If it is intended to prepare such blends having useful properties, it is therefore necessary to add further polymers which act as compatibility agents. In particular, styrene/butadiene block copolymers or selectively hydrogenated styrene/butadiene block copolymers are described for this purpose: Styrene/butadiene/styrene three-block copolymers are recommended, for example, in EP-A-42 153. Star block copolymers composed of butadiene and styrene are described in EP-A-125 227, EP-A-310 051 and U.S. Pat. No. 4,495,323. However, these compatibility agents still contain in their polybutadiene blocks double bonds originating from the butadiene, and the molding materials are therefore not sufficiently resistant to weathering.

DE-A-2 003 916 mentions block copolymers of the X-Y and X-Y-X type, where X is a vinylaromatic and Y is a diene hydrocarbon, and the copolymer may be completely or partly hydrogenated. Hydrogenated styrene/butadiene/styrene three-block copolymers are also used as compatibility agents in EP-A-4685 and EP-A-250 970. DE-A-2 839 357 describes blends of homopolystyrene and a preblended composition of a polyolefin and a selectively hydrogenated linear or radial block copolymer which is composed of vinylaromatic and olefinic units.

It has been found that the known block copolymers give sufficiently tough molding materials but the rigidity of the molding materials, particularly in compositions having relatively high polyolefin contents, is still not sufficient in most cases.

It is an object of the present invention to prepare molding materials of this type which are based on a blend of a polymer composed of styrene and/or substituted styrene and a polyolefin having good toughness and rigidity.

We have found that this object is achieved if a selectively hydrogenated star block copolymer having not less than 50% by weight of styrene is used as the compatibility agent.

The present invention therefore directly relates to a thermoplastic molding material containing, based in each case on the sum of A, B and C, A: from 10 to 90% by weight of a polymer A composed of styrene and/or substituted styrene,
B: from 10 to 90% by weight of a polyolefin B and
C: from 5 to 40% by weight of a star block copolymer C containing not less than 50% by weight of styrene and prepared by anionic polymerization of styrene and butadiene and/or isoprene, coupling and subsequent selective hydrogenation.

Suitable styrene polymers A are both homo- and copolymers of styrene and/or substituted styrenes. Substituted styrenes are preferably methyl-substituted styrenes in which a methyl radical is present as a substituent on the aromatic ring or on the side chain. Particular examples here are p-methylstyrene and α-methylstyrene. Homopolystyrene is particularly preferred.

Homo- or copolymers of styrene can be prepared in a known manner by mass, solution or suspension polymerization. Polymerization can be effected according to the known mechanisms of free radical or anionic polymerization. Processes for the preparation of styrene polymers are known and are described in, for example, Ullmanns Encyklopädie der technischen Chemie, 4th Edition, Volume 19, pages 265 to 273, Verlag Chemie, Weinheim.

Polystyrenes and substituted polystyrenes are commercially available. The viscosity number of the polymers A should be from 50 to 130 ml/g (measured in 0.5% strength solution in toluene at 23° C.).

The amount of the polymer A in the novel molding material is preferably from 30 to 70% by weight.

Suitable polyolefins B of the blends are homo- or copolymers of propylene and of ethylene. Polypropylene, which can be prepared, for example, by the gas phase process using Ziegler-Natta catalysts and has a melt flow index (MFI 190/5) of from 0.1 to 90 g/10 min, may be mentioned here. Polyethylene of the LLDPE, LDPE or HDPE type, prepared by the high pressure, medium pressure or low pressure process and having densities of from 0.1 to 0.97 g/cm$^3$, or copolymers of ethylene, for example with vinyl esters, such as vinyl acetate or vinyl propionate, with acrylates or with propylene, are also suitable. The comonomer content of the ethylene copolymers is from 1 to 65, preferably from 10 to 45, % by weight. The melt flow index of the ethylene polymers may vary within a wide range and is preferably from 0.5 to 40 g/10 min (MFI 190/2.16). A preferred polyolefin is high density polyethylene (HDPE, 0.94–0.97 g/cm$^3$), prepared by the Phillips process (medium pressure process). Another preferred polyolefin is linear low density polyethylene (LLDPE, 0.91–0.94 g/cm³), prepared by the gas phase process.

The content of polyolefin B in the novel molding material should preferably be from 30 to 70% by weight.

The star block copolymer C is a star block copolymer which is produced by anionic polymerization with coupling from styrene and butadiene and which has been selectively hydrogenated. The preparation of star block copolymers which are composed of styrene and butadiene is known per se. Replacement of some or all of the butadiene by isoprene is possible. Suitable block copolymers C have, as a rule, styrene contents of from 20 to 90, preferably from 55 to 90, in particular from 60 to 80, % by weight of styrene (remainder butadiene and/or isoprene).

Branched star block copolymers and their preparation are described in, for example, U.S. Pat. No. 3,281,383 or British Patent 985 614. Polymodal branched block copolymers are disclosed in German Laid-Open Application DOS 1,959,922. [lacuna] other types of branched block copolymers are described in German Laid-Open Application DOS 2,550,227. The coupling reaction for the preparation of branched block copolymers is nonquantitative, so that the branched block copolymers may consist of complex mixtures of linear and branched block copolymers. For the purposes of the present invention, however, the reaction products of the coupling, including the uncoupled components, are understood as being branched block copolymers. Preferably used branched block copolymers are those which have been prepared according to German Laid-Open Application DOS 1,959,922 and in particular according to German Laid-Open Application DOS 2,550,227 (having tapered transitions between the blocks) and have a weight average molecular weight $M_w$ determined by GPC of from 100,000 to 300,000 and from 3 to 5 star branches.

Branched star block copolymers which are selectively hydrogenated in a conventional manner are used according to the invention, only the double bonds originating from the monomer building blocks butadiene and/or isoprene being saturated, and not the styrene component. Such processes are known and can be carried out, for example, by the method described in German Laid-Open Application DOS 2,748,884. For the purposes of the present invention, more than 50%, preferably more than 80%, particularly preferably more than 90%, in particular more than 97%, of the double bonds originally present should be saturated.

In the polymerization of C, it is also possible to use a mixture of styrene and substituted styrene instead of styrene. Preferred substituted styrenes are methyl-substituted styrenes and in particular p-methylstyrene or α-methylstyrene.

The novel molding material should contain from 5 to 40, preferably from 8 to 25, in particular from 10 to 20, % by weight of C.

For further improvement of the properties, the novel molding material may contain additives D which are conventionally used for A, B and/or C. These additives are, for example, heat stabilizers or light stabilizers, slip agents or mold release agents, lubricants, anti-static agents, colorants, such as dyes or pigments, flameproofing agents or reinforcing materials.

The molding materials are prepared by mixing A, B, C and, if required, D by any known method. Mixing of the components is preferably effected at elevated temperatures, for example in the melt, by roll-milling, kneading or extrusion in a single-screw or twin-screw extruder. The additive may be added during mixing of the components A, B and C but may also have been already present in A, B or C.

The parameters used for characterizing the blends are determined as follows:
Yield stress and elongation at break according to DIN 53,455
Tensile modulus of elasticity according to DIN 53,457
Multiaxial toughness as total penetration energy $W_{tot}$ according to DIN 53,443
Yellowness index according to ASTM D 1925

EXAMPLES

The following components were used for the preparation of the novel molding materials and of the comparative materials:

Component A
A: Polystyrene 158K; BASF product

Component B:
B: LLDPE: Lupolen L 3020 GN from BASF (density 0.930 g/cm³ according to DIN 53,479; MFI (190/2.16) from 0.9 to 1.2 g/10 min according to DIN 53,735).

Component C:
C1: Polymodal star block copolymer containing about 75% by weight of styrene and 25% by weight of butadiene, according to German Laid-Open Application DOS 2,550,227, 99% of whose double bonds have been selectively hydrogenated by the process described in German Laid-Open Application DOS 2,013,263.

C2: Polymodal star block copolymer, 99% of whose double bonds have been selectively hydrogenated by the process described in German Laid-Open Application DOS 2,013,263 and which contains about 40% by weight of styrene and 60% by weight of butadiene.

C3: Hydrogenated SBS three-block copolymer containing about 30% by weight of styrene (Kraton G 1650 from Shell AG); for comparative purposes.

C4: Polymodal star block copolymer which is not hydrogenated and contains about 75% by weight of styrene and 25% by weight of butadiene and is prepared according to German Laid-Open Application DOS 2,550,227; likewise for comparative purposes.

The components were mixed in a ZSK 30 twin-screw kneader from Werner & Pfleiderer at 200° C. with a throughput of 10 kg/h. For determining the material properties, moldings were produced at 200° C. by compression molding. The test specimens were exposed using a Xenotest 1200 apparatus from Original Hanau Quarzlampen GmbH for the time shown in the Table.

The values shown in the Table indicate that the novel molding materials have good toughness and in particular good multiaxial toughness without the rigidity being reduced, as observed in the case of Comparative Experiments V4 and V5. The yellowing of the novel molding materials of Examples 1 and 2 is less than that of Comparative Experiments V1 to V5 and substantially less than that of the double bond-containing Comparative Experiments V6 and V7, which is evident from the lower values of the yellowness indices.

The advantages of the novel molding materials in the resistance to weathering compared with conventional high impact polystyrene are evident from the yellowness indices of a high impact polystyrene having a polybutadiene content of 8%, which yellowness indices were measured under conditions identical to those in the Table:

Duration of exposure 0 h: 5.2
Duration of exposure 24 h: 15.7
Duration of exposure 48 h: 27.8
Duration of exposure 96 h: 44.2

10% by weight of butadiene and having an average number of star branches of from 3 to 12 and a weight average molecular weight $M_w$(GPC) of from 100,000 to 300,000.

3. A molding material as claimed in claim 1, containing polyethylene as polyolefin B.

4. A molding material as claimed in claim 1, containing high density polyethylene (HDPE) as polyolefin B.

5. A molding material as claimed in claim 1, containing low density polyethylene (LDPE) as polyolefin B.

6. A molding material as claimed in claim 1, containing linear low density polyethylene (LLDPE) as polyolefin B.

7. A molding material as claimed in claim 1, containing polypropylene as polyolefin B.

8. A molding material as claimed in claim 1, containing homopolystyrene as polymer A.

9. A molding material as claimed in claim 1, containing a star block copolymer C having a degree of hydrogenation of more than 80%.

10. A molding material as claimed in claim 1, containing from 30 to 70% by weight each of A and B.

11. A molding material as claimed in claim 1, containing from 0.05 to 50 parts by weight of conventional additives (component D) per 100 parts by weight of A+B+C.

12. A method of using a molding material as claimed in claim 1 for the production of moldings.

TABLE

Composition and properties of the novel and conventional molding materials

| Example Comparative Experiments | | 1 | 2 | V1 | V2 | V3 | V4 | V5 | V6 | V7 |
|---|---|---|---|---|---|---|---|---|---|---|
| A | [% by wt.] | 45 | 40 | 50 | 45 | 40 | 45 | 40 | 45 | 40 |
| B | [% by wt.] | 45 | 40 | 50 | 45 | 40 | 45 | 40 | 45 | 40 |
| C1 | [% by wt.] | 10 | 20 | — | — | — | — | — | — | — |
| C2 | [% by wt.] | — | — | — | 10 | 20 | — | — | — | — |
| C3 | [% by wt.] | — | — | — | — | — | 10 | 20 | — | — |
| C4 | [% by wt.] | — | — | — | — | — | — | — | 10 | 20 |
| Tensile modulus of elasticity | [N/mm$^2$] | 1139 | 1002 | 915 | 648 | 524 | 515 | 401 | 882 | 974 |
| Yield stress | [N/mm$^2$] | 26.9 | 24.7 | 0.0 | 18.9 | 14.0 | 17.3 | 11.5 | 21.8 | 23.4 |
| Elongation at break | [%] | 11 | 71 | 1 | 13 | 25 | 34 | 79 | 7 | 20 |
| Total penetration energy (Wtot) | [Nm] | 21 | 43 | 1 | 11 | 23 | 12 | 36 | 12 | 36 |
| Yellowness Index after | | | | | | | | | | |
| 0 h of exposure | | 0.7 | 1.8 | 2.3 | 1.9 | 1.5 | 0.8 | 1.2 | 3.9 | 2.5 |
| 24 h of exposure | | 6.6 | 6.2 | 9.1 | 8.6 | 7.9 | 7.7 | 6.8 | 12.8 | 12.6 |
| 48 h of exposure | | 17.3 | 17.6 | 20.0 | 22.4 | 21.8 | 21.6 | 21.1 | 24.4 | 23.2 |
| 96 h of exposure | | 28.3 | 27.4 | 32.2 | 32.7 | 32.0 | 32.0 | 30.0 | 38.7 | 38.1 |

We claim:

1. A thermoplastic molding material containing, based in each case on the sum of components A, B and C, A: from 10 to 90% by weight of a polymer A composed of styrene or substituted styrene, B: from 10 to 90% by weight of a polyolefin B and C: from 5 to 40% by weight of a star block copolymer C containing not less than 50% by weight of a styrene and prepared by anionic polymerization of styrene and butadiene or isoprene, coupling and subsequent selective hydrogenation, whereby only the double bonds originating from the monomer building blocks of butadiene and/or isoprene are saturated, and not the styrene component, so that more than 50% of the double bonds originally present are saturated.

2. A molding material as claimed in claim 1, containing, as star block copolymer C, a star block copolymer of from 60 to 90% by weight of styrene and from 40 to